J. A. CRESSEY.
PROCESS OF PRODUCING CONFECTIONS.
APPLICATION FILED JULY 28, 1919.
1,383,290. Patented July 5, 1921.
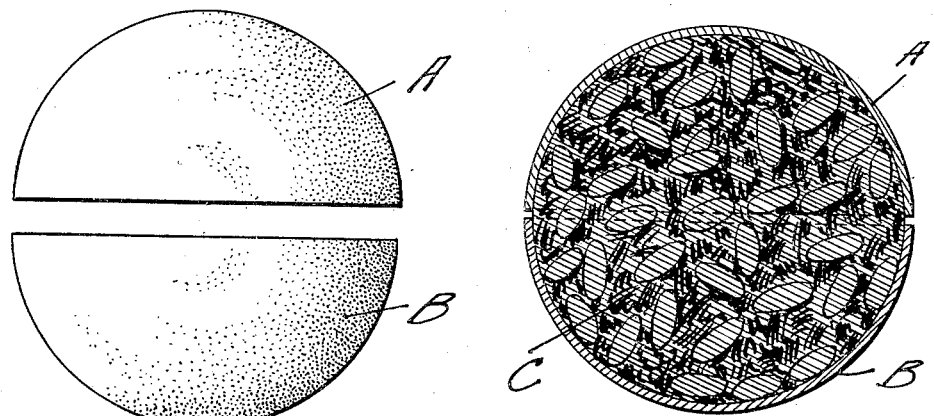
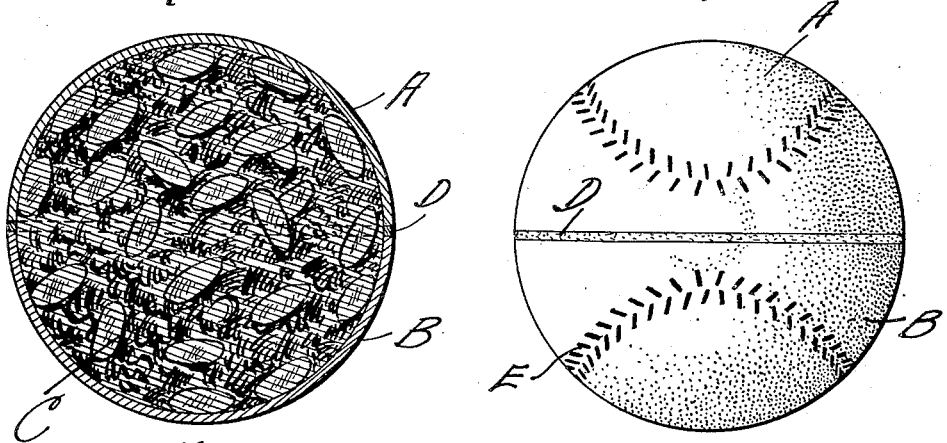
Inventor
J. A. Cressey
By Jack A. Ashley
Attorney

UNITED STATES PATENT OFFICE.

JOHN A. CRESSEY, OF DALLAS, TEXAS.

PROCESS OF PRODUCING CONFECTIONS.

1,383,290.  Specification of Letters Patent.  Patented July 5, 1921.

Application filed July 28, 1919. Serial No. 313,919.

*To all whom it may concern:*

Be it known that I, JOHN A. CRESSEY, a citizen of the United States, residing at Dallas, in the county of Dallas and State of Texas, have invented certain new and useful Improvements in Processes of Producing Confections, of which the following is a specification.

This invention relates to new and useful improvements in processes of producing confections.

It has long since been the custom to vend such confections as popcorn, peanuts and certain candies in paper sacks or boxes. Considerable effort has been made to improve the package and offer a better article.

The purpose of this invention is to produce a confection which includes an edible container or holder for an edible filling, and has particularly to do with the process of making.

In carrying out the invention a plurality of sections are formed of dough or other suitable material and baked crisp. A filling of edibles is made in the shape of a ball and the sections assembled around the filling. A suitable sealing material is applied to the edges of the sections so as to hold them together. As an alternative a sack of peanuts may be inclosed in the sections instead of the ball of sweetmeats.

The invention will be more readily understood from a reading of the following specification and by reference to the accompanying drawings, in which an example of the invention is shown and wherein:

Figure 1 is an elevation showing two semi-spherical sections made in accordance with the process, Fig. 2 is a sectional view of the sections filled with confections, Fig. 3 is a similar view showing the sealing material in place, and Fig. 4 is an elevation of the completed article.

In the drawings A and B designate two semi-spherical sections or halves which may be made of dough and baked crisp. This dough which is thus baked crisp possesses a porous or grain appearance. These sections have a filling C which may include popcorn, peanuts, candies, raisins or any other confections or sweets. The sections are fastened together by a sealing material D, such as dough mixed with gelatin. Where the sections are made to represent a baseball ornamental marks E, simulating stitching may be used.

In carrying out the process a suitable batter is made of flour and water or other ingredients. This batter is baked in molds to produce the sections A and B, which it is understood are not limited to the shape shown in the drawings.

The next step consists in preparing and producing the confection C which may include popcorn either plain or sweetened, candy wrapped or unwrapped, or peanuts, which if salted, must be contained in a moisture-proof sack. Other ingredients may be used and a mixture of ingredients make a very attractive package.

As an illustration we will use a filling composed of popcorn, candy, split peanuts, sugar and water. These ingredients are properly mixed and molded or pressed into balls. These balls have diameters such as to permit them to fit snugly in the sections A and B.

The sections having been made, are placed before an operator who is also provided with a sealing material such as dough mixed with gelatin, which will harden and form a cement. The operator picks up two of the sections or halves and dips the edges in the sealing material and then catches the filling ball between the sections and brings the latter together around the ball. The filling ball is thus inclosed and the edges of the sections sealed and fastened together. As soon as the sealing material or cement "sets" the sections are firmly secured to each other.

It will be seen that the filling ball is fully covered and foreign matter excluded, thereby making a sanitary package. If salted peanuts are used the filling must be inclosed in a moisture-proof sack before inserting in the sections.

It is pointed out that the crisp nature of the sections does not permit of much pressure, therefore it is desirable to previously mold the filling into a ball, thus compacting said ingredients and not depending upon the assembling of the sections to perform this office.

The package is now complete and ready for vending. The stitches E may be printed on the package if a representation of a baseball is being made. It is obvious that the whole article may be eaten and there is no waste.

What I claim, is:

1. The herein described method of producing a new article of manufacture which is edible throughout, which consists in molding dough into casing-sections and baking the same, molding an edible filling to fit within the casing-sections, applying a cement to the edges of the casing-sections, placing such sections upon the molded filling so that the cement coated edges are brought near each other, allowing the cement to harden, whereby the casing-sections are united and their edges sealed, and printing stitching upon the assembled sections.

2. The herein-described method of producing a new article of manufacture which is edible throughout, which consists in molding dough into casing-sections and subjecting the same to heat so that they are baked crisp, dipping the edges of the casing-sections in a cement, placing an edible filling within the casing-sections and moving the edges thereof in proximity to each other allowing the cement to harden, and printing a seam upon the exterior surface of the casing-sections.

3. The herein-described method of producing a new article of manufacture, which is edible throughout, which consists in molding dough into casing-sections and baking the same, molding an edible filling to fit within the casing-sections when assembled, applying a cement to the edges of the casing-sections and placing such sections upon the molded filling so that such edges are secured together.

4. The herein-described method of producing a new article of manufacture which is edible throughout, which consists in molding dough into a pair of relatively thin curved casing sections and baking the dough crisp so that it possesses a porous or grain appearance, molding an edible filling to fit snugly within the pair of casing sections, applying the casing sections to the molded filling to inclose the same, applying cement which is edible to the edges of the casing sections and allowing the cement to harden, and forming a seam upon the casing sections whereby the completed article simulates a ball used in playing games.

In testimony whereof I affix my signature.

JOHN A. CRESSEY.